United States Patent
Finke

(10) Patent No.: US 12,420,449 B2
(45) Date of Patent: Sep. 23, 2025

(54) DEVICE FOR METERING PAINT PIGMENTS AS AN ADDITIVE FOR CEMENT OR ALTERNATIVE CEMENT FOR THE PRODUCTION OF COLORED CONCRETE PRODUCTS

(71) Applicant: Michael Finke, Lage (DE)

(72) Inventor: Michael Finke, Lage (DE)

( * ) Notice: Subject to any disclaimer, the term of this patent is extended or adjusted under 35 U.S.C. 154(b) by 206 days.

(21) Appl. No.: 18/448,602

(22) Filed: Aug. 11, 2023

(65) Prior Publication Data

US 2024/0051182 A1 Feb. 15, 2024

(30) Foreign Application Priority Data

Aug. 15, 2022 (DE) ...................... 10 2022 120 548.7
Jul. 28, 2023 (DE) ...................... 10 2023 120 148.4

(51) Int. Cl.
*B28C 7/02* (2006.01)
*B28C 7/04* (2006.01)

(52) U.S. Cl.
CPC ............... *B28C 7/024* (2013.01); *B28C 7/04* (2013.01); *B28C 7/0418* (2013.01); *B28C 7/0422* (2013.01)

(58) Field of Classification Search
CPC .. B28C 7/024; B28C 7/02; B28C 7/04; B28C 7/00418; B28C 7/0422
USPC ........................................ 222/52, 55, 56, 57
See application file for complete search history.

(56) References Cited

U.S. PATENT DOCUMENTS

| | | | | |
|---|---|---|---|---|
| 5,025,954 A | * | 6/1991 | Dunnous | G01F 11/284 |
| | | | | 134/57 R |
| 2010/0154680 A1 | | 6/2010 | Friedrich et al. | |
| 2025/0128473 A1 | * | 4/2025 | Lootens | B33Y 10/00 |

FOREIGN PATENT DOCUMENTS

| | | |
|---|---|---|
| AT | 410421 B | 4/2003 |
| DE | 2315400 C2 | 9/1982 |
| DE | 19854650 A1 | 5/2000 |
| DE | 10002559 B4 | 7/2004 |
| DE | 10146408 B4 | 3/2006 |
| EP | 0050354 B1 | 10/1981 |

(Continued)

OTHER PUBLICATIONS

First Office Action with search report for DE 10 2022 120 548.7, all pages.

(Continued)

*Primary Examiner* — David J Walczak
(74) *Attorney, Agent, or Firm* — Kilpatrick Townsend & Stockton LLP

(57) ABSTRACT

Device for metering color pigments as an additive for cement or alternative cement for the production of colored concrete products, comprising at least three containers for receiving respectively different color pigments, a control unit for setting the discharge quantities from the containers, and a sensor system coupled to the control unit in order to meter a color pigment composition taking into account the discharge quantities detected by the sensor system, wherein at least one brightness value L* value for the inherent color of the cement or alternative cement of the concrete product to be colored in each case is stored or storable in the control unit, and the control unit is configured to apply a color triangle as a function of the at least one L* value for controlling the output of predetermined quantities of the (Continued)

Figure 1:
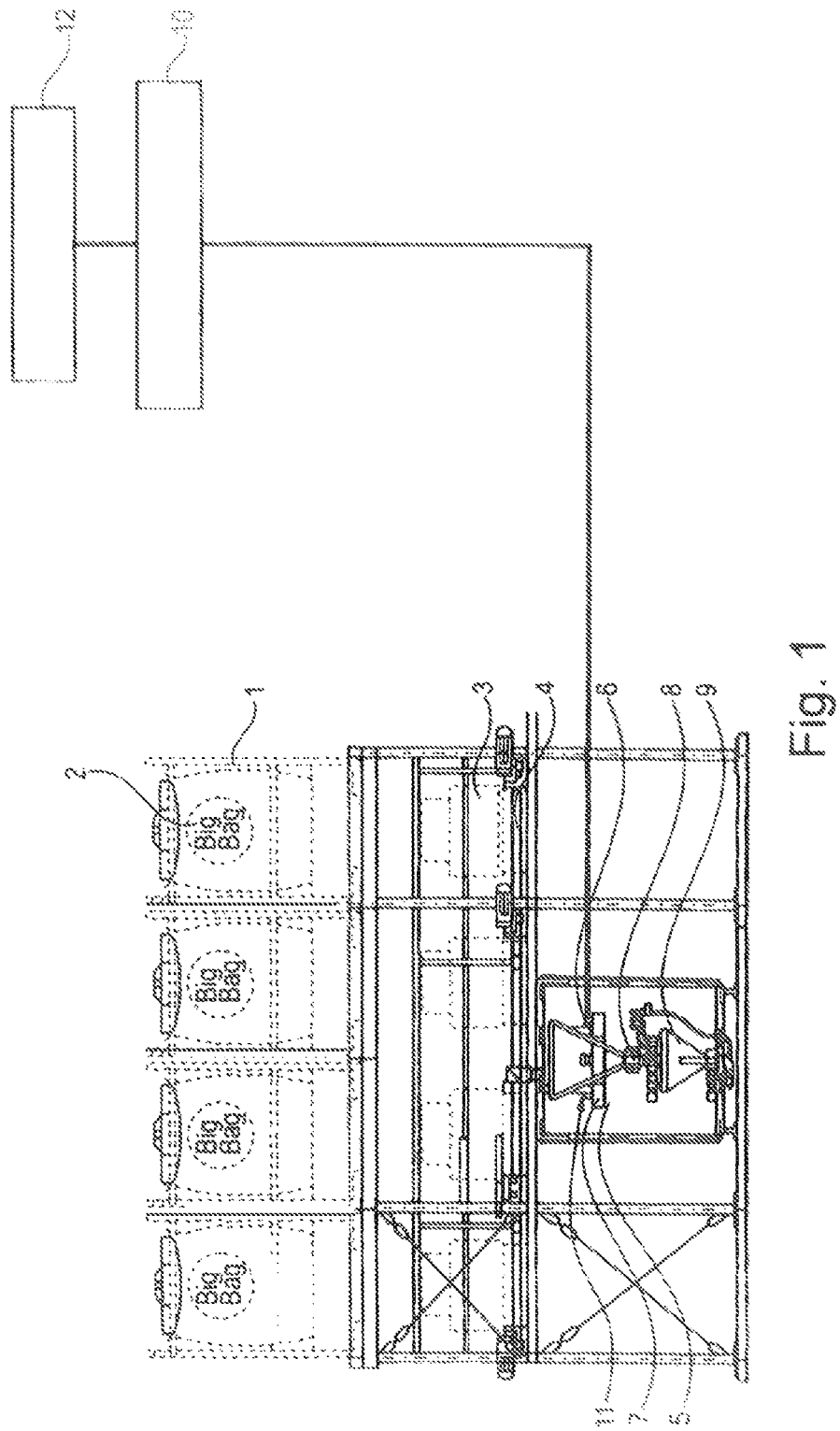

color pigments from the at least three containers based on a set of three standard color values X, Y, Z.

11 Claims, 3 Drawing Sheets

(56) References Cited

FOREIGN PATENT DOCUMENTS

| EP | 0446168 A1 | 9/1994 |
|---|---|---|
| EP | 3732143 B1 | 11/2021 |

OTHER PUBLICATIONS

Combined Search and Examination Report (CSER) for GB2312379.7 mailed Feb. 9, 2024, 5 pages.
Miranda J. et al., Methodology for the restoration of heritage built in exposed concrete. The case study of 'Piscina das Mar'es', Portugal. *Construction and Building Materials* 328 (2022) 127040, Mar. 9, 2022, 15 pages.

\* cited by examiner

DEVICE FOR METERING PAINT PIGMENTS AS AN ADDITIVE FOR CEMENT OR ALTERNATIVE CEMENT FOR THE PRODUCTION OF COLORED CONCRETE PRODUCTS

CROSS REFERENCE TO RELATED APPLICATIONS

This application claims priority to German Patent Application No. 10 2023 120 148.4, filed Jul. 28, 2023 and German Patent Application No. 10 2022 120 548.7, filed Aug. 15, 2022, the contents of which are hereby incorporated by reference in their entirety for all purposes.

The invention relates to a device for metering paint pigments as an additive for cement or alternatives cement for the production of colored concrete products. In particular, powder/granule pigments are used as dry colored substances that can be stored in a metering plant from whereby weighing predetermined quantity ratios of different paint pigments build up an admixture dosage to change the color of concrete, for individual market needs or aesthetics by using only a few basic (primary) pigments. Liquid pigments can be used alternatively or in addition.

With its almost unlimited shapeability and functionality, concrete offers many possibilities for creative architecture. Concrete is the most widely used building material and it has proven desirable in many cases to design concrete in color, so that not only the grey concrete prevails. As an example, colorful facing panels, colored paving stones and roof tiles are of great interest.

It is known to use pigments for coloring concrete, which are carefully mixed with cement and water and, if necessary, sand and/or fibrous materials and, if required, other additives, and then further processed. In terms of construction technology, pigments act as inert fillers. The pigments are offered in various delivery forms, such as powder, granules or liquid colors. The pigments can be mixed with each other and can thus be matched to the respective design requirements. However, the color of integrally colored concrete is subject to various factors.

Generally, only three components are required for concrete production, namely water, aggregate and cement. Depending on the working place and production method, grey cement can have a color spectrum ranging from bright to dark grey and even reddish brown. A more intense, pure shade are achieved with bright colored cements. Darker cements can also be used to produce concrete components with stronger color shades, such as dark red, ochre and brown. In general, colored concrete produced with grey cement have usually muted colors. If, on the other hand, elements with more bright colors are to be achieved, white cement should be used.

When coloring concrete, the required amount of pigment is calculated in relation to the cement. Only a small amount of pigment is required to produce a corresponding color effect. As a rule, between 2 and 8% of the cement content of color pigment is added to the concrete. It should be noted that the color intensity initially increases linearly with the amount of pigment, but stagnates above a certain percentage—the color saturation level. The addition of further pigments then has hardly any effect.

As soon as the cement comes into contact with water, fine crystal needles are formed which interlock with each other, i.e. the concrete hardens. The correct mixing ratio of water and cement (w/c ratio) is important for the hardness and the inherent color of the concrete. The greater the w/c ratio, the more pores are created in the concrete. These scatter the light and make it appear brighter. The use of concrete admixtures, such as concrete plasticizers or similar, must be taken into account. These admixtures are usually used to reduce the amount of mixing water and thus result in darker concrete.

With approx. 70% by volume, the aggregate makes up the largest proportion of the concrete composition. Consequently, it contributes an important part to the inherent color of the concrete. In the case of colored concrete whose cement skin is untreated, only the fine aggregates influence the appearance of the element. The eye catches only a mixture of the inherent color of aggregate, cement and pigment. Aggregates such as sand and gravel come from nature and are subject to color variations.

Another color phenomenon is that colored concrete becomes brighter and brighter over a long period of time. This is not because the pigments fade, but is due to the setting behavior of the concrete. Even after many years, uncoated concrete continues to set, as a result of which the pigment particles become increasingly trapped in the cement and are less visible. The concrete consequently becomes brighter due to surface erosion.

The appearance of colored concrete is consequently influenced by numerous different factors. In order to achieve a satisfactory result, a large number of proposals are already known in the state of the art, with which an improved coloring effect as well as an excellent color strength of the coloring are to be achieved.

DE 100 02 559 B4 provides an overview of the relevant state of the art in connection with inorganic pigments used for coloring cement-bound building materials, for example concrete. The addition of wetting and/or dispersing agents in the form of strongly hydrophilic polymers is recommended to ensure that the pigments are suspended sufficiently quickly and sufficiently completely for coloring in aqueous building material mixtures. Adding an aqueous suspension of a pigment to an aqueous plastic dispersion is also known from DE 23 15 400 C2. The inherent color of sand, gravel or crushed rock, which sets narrow limits on the color design of mineral granular material, is to be counteracted by fixing a colorant on the surface of the material. Artificial coloring is applied to the surface. Reference is also made in this respect to EP 0 050 354 B1.

From DE 198 54 650 A1 it is known to react a dye with a granular carrier material at elevated temperature for coloring mineral casting compounds, in particular concrete, so that the granular carrier material at least partially melts on the surface and is embedded in the molten carrier matrix. Finally, it is known from DE 101 46 408 B4 to use a colored quartz grain.

The disadvantages in each case are the high technological expense and the poor durability of the color fastness resulting from the use of synthetic resin as a binder, as well as the poor strength of the concrete.

The above statements apply in the same way to the alternatives to conventional cement. Climate-friendly alternatives to conventional cement, i.e. so-called cement substitutes, are currently being developed. Using a still unused overburden product from bauxite mining as a raw material, carbon dioxide ($CO_2$) emissions during production can be reduced by up to two thirds. At the same time, the alternative cement is just as stable as the portland cement. Since increasing $CO_2$ values may be polluting, research into alternatives to cement has been going on for several years. Cement production generally does not work entirely without calcium carbonate, but at least 50 to 60 percent of the carbonic acid lime can be replaced by substitutes. The subject matter of the present application thus relates not only to cement, but also to alternative cement containing, for example, up to 60 percent substitution materials such as bauxite/Belterra clay. This alternative cement or cement substitute also has its inherent color, which influences the color design of concrete.

It is therefore an object of the invention to increase the color shade possibilities of cement-bound products or of alternative cement-bound products, in particular colored pigmented concrete. The present invention is further directed to an improvement of the coloring of concrete, irrespective of whether cement or alternative cement is used.

This object is solved by the features of claim 1.

Herewith a device for metering paint pigments as an additive for cement or alternative cement for the production of colored concrete products is provided, which controls the discharged or served quantities of paint pigments depending on color measurements of real colored concrete products. With the help of, for example, the CIE31 color space, a color triangle can be established on the basis of three measurement values XYZ, which are drawn from the real colored concrete products. These standard color values can then be used to determine colors that lie within this color triangle. Mathematical transformations have been developed for the CIE31 color space to obtain a uniform color space.

Among other things, the CIELab system was developed, which is limited to the examination of body or solid member colors.

The CIE76 color space, also called CIELab color space or CIELab system, is based on a nonlinear transformation of the X, Y, Z color space (CIE31). A color space is defined in that equal geometric distances correspond to equal sensible distances. Each color in the color space is defined by the chromaticity coordinate with the L* axis representing brightness. The L* axis can also be called the neutral grey axis, since it has the endpoints black (L=0) and white (L=100) and the intermediate values on this axis are the achromatic greys. The formula for the transformation and calculation of the CIE color space (CIELab) based on XYZ (CIE 31) is generally known (see datacolor, The Color Measurement—The CIE Color Space, Chapter 10, The Color Spaces 9-14, October 2019, www.datacolor.com).

It is to the inventor's credit to have surprisingly established that the CIEL*a*b* system defines color spaces that can be used in the coloring of concrete products. According to the invention, the inherent color of the cement or alternative cement is applied as the L* value for brightness, the inherent color of which is transferable to shades of grey between the end points black (L*=0) and white (L*=100).

It has been found that the coloring of cementitious products leads to improved color design if the inherent color of the cement or alternative cement used is stored or can be stored in the control unit. The control of mixing ratios then takes place after a kind of pre-calibration. This pre-calibration takes into account the extent to which the respective given inherent color of the cement or alternative cement used lies in the color spectrum between light grey, dark grey or white cement or alternative cement. Unlike in the prior art, the inherent color of the cement or alternative cement is not masked or separated according to the invention, but is taken into account with its proportion or share in a controllable color system. The inherent color of the cement or alternative cement used in each case enters as a normalization factor into a color design that uses a color model based on the color triangle principle. The control of the mixing ratio by the control unit adjusts the proportions of the color pigments/color pigment mixtures to be mixed in relation to each other depending on the inherent color of the cement or alternative cement. The use of the color triangle principle also enables the mixing ratios to be adjusted to selectable color shades for specified colors. The brightness value L* for cement or alternative cement is preferably between about 40 and 92.5. This cement grey scale describes such brightness values L* for grey and white cement or alternative cement.

According to the invention, the defined color triangle allows colors to be defined by numbers which are controlled by the control unit as metering quantities of the at least three basic colors. For this purpose, a color generator can be assigned to the control unit online or offline. The color generator is an intelligent detection device which adapts a colored real concrete with the respective inherent color of the cement or alternative cement as a normalization variable for adapting the mixing ratios of the paint pigments/paint pigment mixtures in a color triangle for the control unit, so that the desired color result corresponds to the mixing ratios controlled by the control unit.

According to the invention, at least three standard color values are thus drawn from real mixtures with pigments, aggregates and cement or alternative cement, for example RGB values, and the L* value (brightness/darkness) of the cement or alternative cement. These real mixtures make up the color triangles in which the user can control his own color shades with his cement or alternative cement and aggregates, in particular sand, gravel, etc. his device for metering paint pigments for the production of desired colored concrete products.

By using primary pigments, stock levels can be significantly reduced, resulting in considerable economic benefits.

For further advantages and embodiments of the invention, see the following description and dependent claims.

Figure 2:
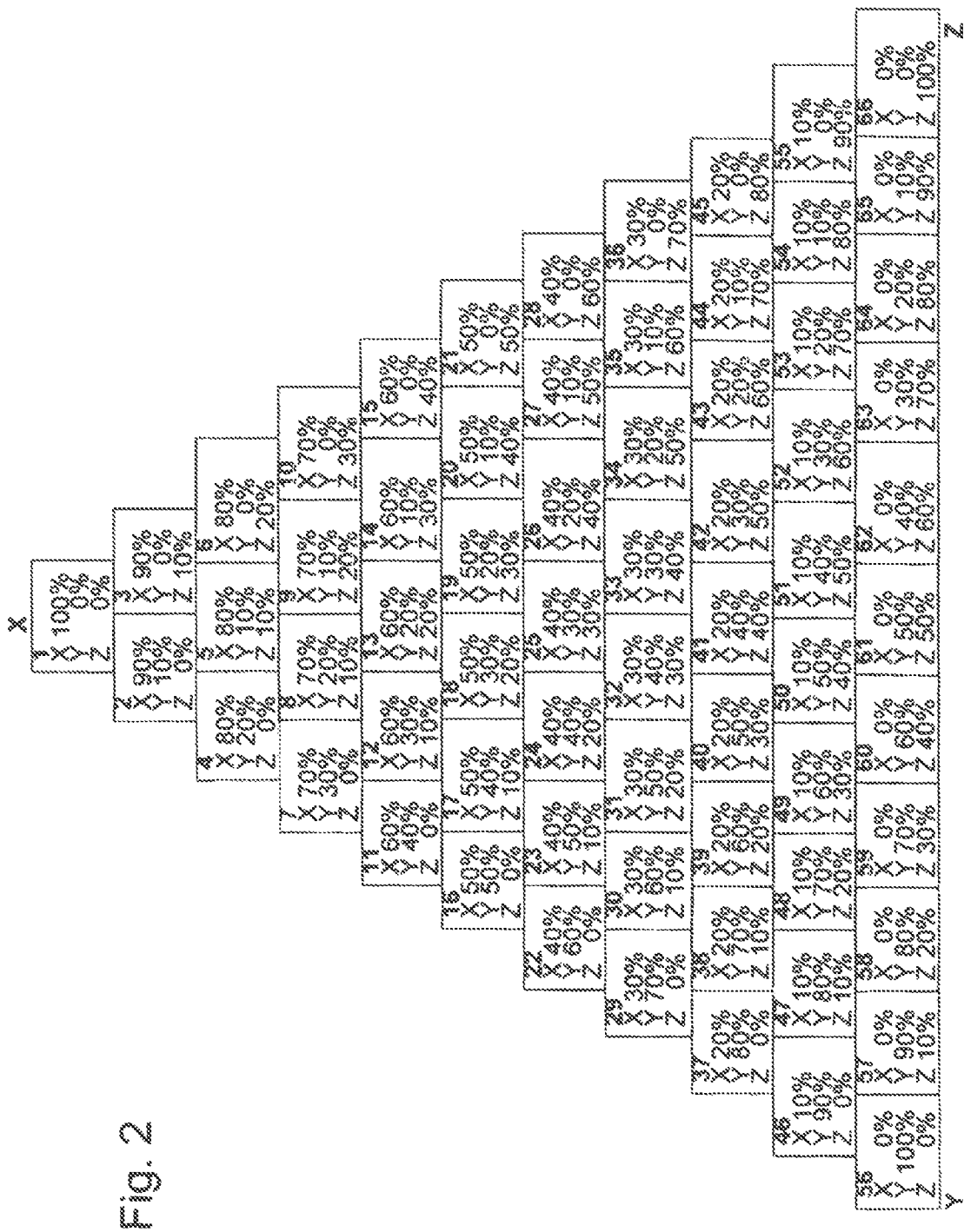
Figure 3:
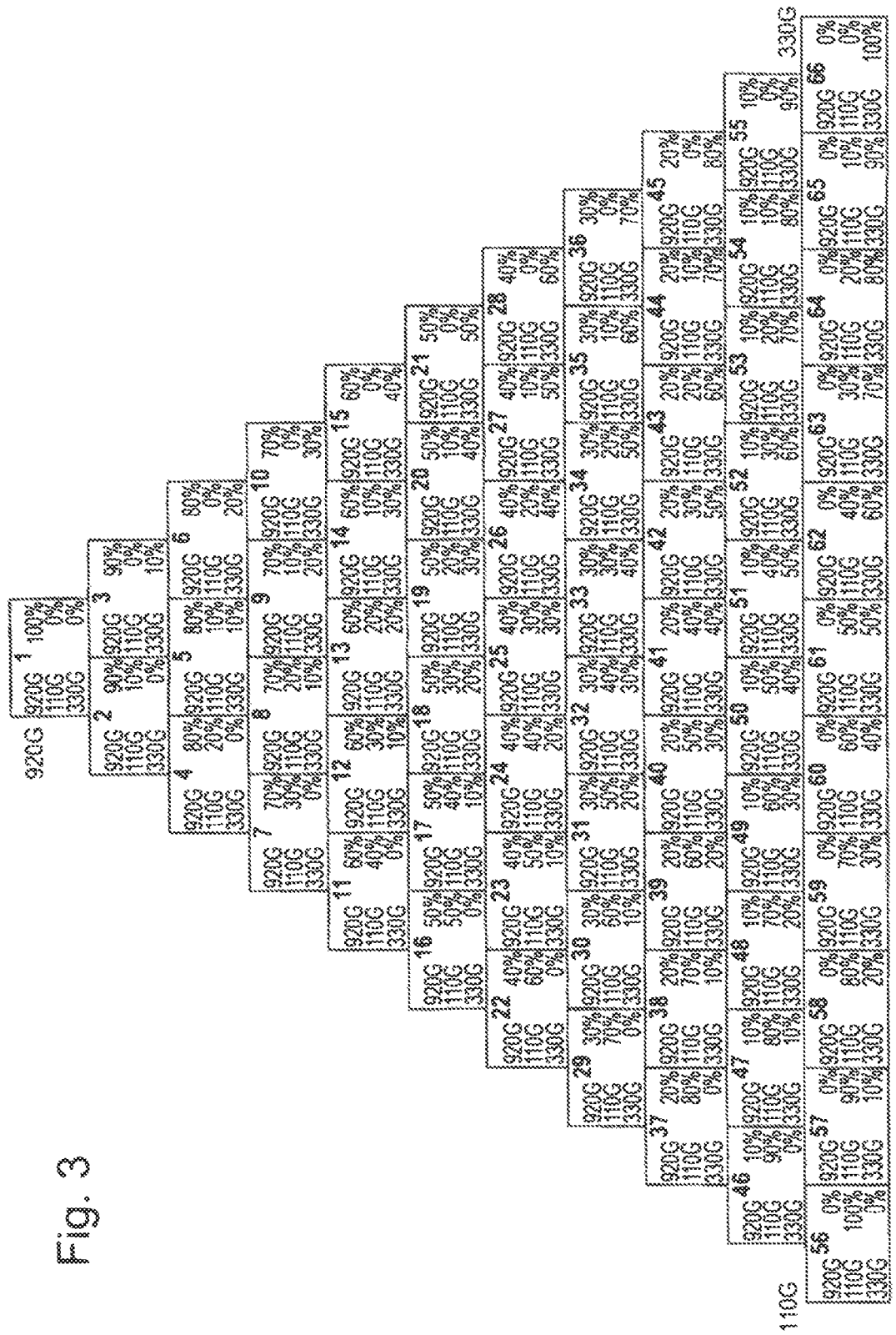

The invention is explained in more detail below with reference to the embodiments shown in the accompanying figures.

a. FIG. 1 shows a schematic front view of a metering and dispensing system for paint pigments, b. FIG. 2 shows a color triangle with percentages, c. FIG. 3 shows a color triangle with the pigment colors 110G, 330G, 920G The invention relates to a device for metering colored pigments as an additive for cement or alternative cement for the production of colored concrete. The system is designed for batch weighing combined with preferably mechanical/pneumatic transfer to meter and discharge pigments in powder form to a concrete production equipment (not shown).

The metering and dispensing system shown in FIG. 1 preferably comprises a platform structure 1 in which several containers 2 are placed. At least three containers 2 are provided for holding different color pigments or color pigment mixtures in each case. For example, these are powder pigments which can be contained in big bags and which can be suspended in the top of the stage structure 1. Transfer containers 3 are preferably provided below the at least three containers 2.

From the transfer containers 3, the respective color pigment or color pigment mixture passes to an associated transferring device, for example in the form of a screw conveyor 4, which serves to convey the respective color pigment or color pigment mixture into a weighing device 5.

The weighing device 5 comprises a weighing container 6 which can be closed by a closing flap and which, in the embodiment shown, is funnel-shaped and is suspended via pressure cells 7 scanned with respect to the weight. The weighing container 6 has an outlet 8 at the bottom which can be emptied via a closure, such as an emptying flap. The weighing container 6 is emptied after reaching a predetermined weight by receiving a corresponding amount of color pigment or color pigment mixture. The weighing container 6 can be scanned with respect to its weight in order to be able to check whether it has been completely emptied. A pressure vessel 9 can be used to transfer the material out of the metering and dispensing system to a concrete plant including for example a concrete mixing vessel.

A control unit 10 is provided for setting the discharge quantities from the containers 2. A sensor system 11 is coupled to the control unit 10 in order to meter a color pigment composition taking into account the discharge quantities detected by the sensor system 11. The sensor system 11 can be, for example, the weighing container 6 with the pressure cells 7. The color pigment composition can be metered additively in the weighing container 6, for example, before being dispensed to a concrete plant or a concrete mixing vessel.

At least one brightness value L* value for the inherent color of the cement or alternative cement of the respective concrete product to be colored is stored or storable in the control unit 10. The control unit 10 is designed to use three definable standard color values to apply a color triangle depending on the at least one L* value, namely for controlling the output of defined quantity ratios of the color pigments from the at least three containers 2. The standard color values preferably define absolute colors such as, for example, RGB for the brightness value L* of the inherent color of the cement or alternative cement used in each case.

An RGB color space is an additive color space that replicates color perceptions by mixing three primary colors (red, green, and blue). This color space is basically based on the three-color theory and is used in television, computer monitors, video projectors, etc. The colors are represented by additive superposition of red, green and blue pixels.

The RGB values range from 0 to 255. Black exists when R=0, G=0 and B=0, white exists when R=255, G=255 and B=255. With these values, almost 16.6 million color shades are achievable.

As an example, R=127.5, G=127.5 and B=127.5 results in a grey that corresponds to the grey in the CIEL*a*b* color space L*=50, a*=0, b*=0. There is a mathematical relationship between CIEL*a*b* and RGB.

The control unit 10 preferably has an input mask for the standard color values X, Y, Z defined by a CIELab color space, for example RGB values, related to the brightness value L* of the inherent color of the cement or alternative cement used in each case. The stored or storable L* value is determined by the grey tones of the inherent color of a cement or alternative cement with values between 40 and 92.5.

The different color pigments or color pigment mixtures are preferably primary color pigments.

The control unit 10 is further preferably designed to generate color tones from the standard color values X, Y, Z, for example RGB values (RGB=red, green, blue) by controlling mixing ratios at output quantities of the color pigments or color pigment mixtures from the at least three containers 2.

A color generator 12 can be assigned to the control unit 10 online or offline. The control of the output of defined quantity ratios of the color pigments can be calibrated by measuring a real concrete product.

The control unit 10 further preferably has an input mask for selectable or changeable input of an L* value of the respective cement or alternative cement used.

The color generator 12 is used in particular for controlling a device described above for metering color pigments as an additive for cement or alternative cement for the production of colored concrete products. The device comprises at least three containers for holding different color pigments in each case, a control unit for setting the discharged quantities from the containers, and a sensor system coupled to the control unit in order to meter a color pigment composition taking into account the discharge quantities detected by the sensor system. At least one brightness value L* value for the inherent color of the cement or alternative cement of the concrete product to be colored in each case is stored or storable in the control unit. The control unit is designed to use three definable standard color values X, Y, Z, for example RGB values, to apply a color triangle depending on the at least one L* value for controlling the output of defined quantity ratios of the color pigments from the at least three containers.

FIG. 2 shows a color triangle with the standard color values X, Y, Z drawn from a real mixture of a concrete product, for example measured with a spectrometer. According to the invention, a main feature is that the pigments are mixed with the aggregates and cement or alternative cement and standard color values, for example RGB values related to the brightness value L* of the inherent color of the cement or alternative cement used in each case, are defined from them. The color triangles are composed of these real mixtures, as shown for example in FIG. 2. The user can work with his own colors with his cement or alternative cement, sand, gravel etc. in the triangle. The inherent color of the cement or alternative cement that the user uses in each case, be it lighter gray, darker gray or white cement or alternative cement, is taken into account by the control unit or color generator. The user enters the L* value (brightness/darkness) of the cement or alternative cement and the pigment addition into the control unit and selects a color from the respective color triangle for the control of the metering and dispensing system. If the inherent color of the cement or alternative cement used changes, the input of the L* value is changed and thus the operation of the metering and dispensing system is readjusted while changing the recipe, i.e. the mixture of the color pigments from the at least three containers 2.

FIG. 3 shows an example of a color triangle with percentage mixing ratio change of the three standard color values, indicated here as 100G, 330G and 920G, to represent different color shades.

Table 1 to Table 4 show colorimetric values according to the invention of various percentage additions related to the cement or alternative cement of real concrete products.

TABEL 1

| pigment | % | cement | L | a | b | R | G | B |
| --- | --- | --- | --- | --- | --- | --- | --- | --- |
| Bfx 920 Std. | 0.5% | W | 70.15 | 3.54 | 21.42 | 192.32 | 168.06 | 132.92 |
| Bfx 920 Std. | 1.0% | W | 67.84 | 5.80 | 26.97 | 192.32 | 160.24 | 116.98 |
| Bfx 920 Std. | 2.0% | W | 65.83 | 8.13 | 31.38 | 192.23 | 153.27 | 103.93 |

TABEL 1-continued

| | | | | | | | | |
|---|---|---|---|---|---|---|---|---|
| Bfx 920 Std. | 2.5% | W | 64.76 | 9.17 | 33.39 | 191.57 | 149.72 | 97.60 |
| Bfx 920 Std. | 3.0% | W | 64.10 | 9.71 | 34.10 | 190.78 | 147.61 | 94.67 |
| Bfx 920 Std. | 4.0% | W | 63.09 | 10.66 | 35.93 | 189.97 | 144.29 | 88.82 |
| Bfx 920 Std. | 5.0% | W | 62.47 | 11.10 | 36.15 | 188.93 | 142.38 | 86.91 |
| Bfx 920 Std. | 0.5% | G | 53.73 | 1.25 | 12.45 | 139.09 | 126.93 | 107.14 |
| Bfx 920 Std. | 1.0% | G | 53.03 | 1.89 | 15.49 | 140.01 | 124.63 | 100.21 |
| Bfx 920 Std. | 2.0% | G | 53.00 | 2.51 | 18.12 | 142.28 | 124.07 | 95.63 |
| Bfx 920 Std. | 2.5% | G | 52.85 | 3.14 | 19.84 | 143.71 | 123.25 | 92.32 |
| Bfx 920 Std. | 3.0% | G | 52.95 | 3.92 | 22.02 | 146.19 | 122.95 | 88.81 |
| Bfx 920 Std. | 4.0% | G | 52.50 | 4.62 | 23.75 | 146.81 | 121.33 | 84.73 |
| Bfx 920 Std. | 5.0% | G | 52.26 | 5.10 | 24.77 | 147.32 | 120.40 | 82.39 |

| | % | cement | L* | a* | b* | R* | G* | B* |
|---|---|---|---|---|---|---|---|---|
| white cement | | W | 78.23 | 0.90 | 5.84 | 199.96 | 192.51 | 182.73 |
| grey cement | | G | 53.82 | 0.73 | 8.71 | 136.16 | 127.66 | 113.75 |

TABEL 2

| pigment | % | cement | L | a | b | R | G | B |
|---|---|---|---|---|---|---|---|---|
| Bfx 110 Std. | 0.5% | W | 59.07 | 17.60 | 14.85 | 180.61 | 130.29 | 117.02 |
| Bfx 110 Std. | 1.0% | W | 54.55 | 20.87 | 16.38 | 173.51 | 116.34 | 103.28 |
| Bfx 110 Std. | 2.0% | W | 49.23 | 23.90 | 18.17 | 163.62 | 100.63 | 87.47 |
| Bfx 110 Std. | 2.5% | W | 48.15 | 24.42 | 18.36 | 161.38 | 97.53 | 84.60 |
| Bfx 110 Std. | 3.0% | W | 46.68 | 24.91 | 18.72 | 158.06 | 93.49 | 80.53 |
| Bfx 110 Std. | 4.0% | W | 45.01 | 25.33 | 18.80 | 153.99 | 89.04 | 76.49 |
| Bfx 110 Std. | 5.0% | W | 43.46 | 25.82 | 19.17 | 150.43 | 84.84 | 72.29 |
| Bfx 110 Std. | 0.5% | G | 49.41 | 8.01 | 10.92 | 137.80 | 112.22 | 99.38 |
| Bfx 110 Std. | 1.0% | G | 47.22 | 11.54 | 12.23 | 138.04 | 104.53 | 92.01 |
| Bfx 110 Std. | 2.0% | G | 44.03 | 15.32 | 14.24 | 135.94 | 94.15 | 81.23 |
| Bfx 110 Std. | 2.5% | G | 43.61 | 16.33 | 14.53 | 136.36 | 92.44 | 79.81 |
| Bfx 110 Std. | 3.0% | G | 42.38 | 17.40 | 15.39 | 134.88 | 88.68 | 75.56 |
| Bfx 110 Std. | 4.0% | G | 41.69 | 18.96 | 16.22 | 135.46 | 85.87 | 72.67 |
| Bfx 110 Std. | 5.0% | G | 40.34 | 19.91 | 16.98 | 133.36 | 81.90 | 68.35 |

TABEL 3

| pigment | % | cement | L | a | b | R | G | B |
|---|---|---|---|---|---|---|---|---|
| Bfx 130 Std. | 0.5% | W | 59.01 | 15.08 | 9.02 | 173.59 | 132.21 | 126.87 |
| Bfx 130 Std. | 1.0% | W | 53.40 | 18.50 | 10.35 | 164.13 | 115.48 | 110.61 |
| Bfx 130 Std. | 2.0% | W | 48.52 | 20.51 | 10.90 | 153.98 | 101.80 | 97.76 |
| Bfx 130 Std. | 2.5% | W | 46.46 | 21.19 | 11.31 | 149.51 | 96.18 | 92.12 |
| Bfx 130 Std. | 3.0% | W | 45.63 | 21.57 | 11.62 | 147.92 | 93.84 | 89.63 |
| Bfx 130 Std. | 4.0% | W | 43.27 | 22.55 | 12.33 | 143.14 | 87.30 | 82.89 |
| Bfx 130 Std. | 5.0% | W | 42.55 | 22.94 | 12.61 | 141.82 | 85.24 | 80.76 |
| Bfx 130 Std. | 0.5% | G | 49.80 | 6.76 | 8.47 | 135.51 | 114.08 | 104.40 |
| Bfx 130 Std. | 1.0% | G | 46.94 | 9.97 | 9.21 | 133.45 | 104.99 | 96.30 |
| Bfx 130 Std. | 2.0% | G | 44.46 | 13.56 | 9.98 | 132.67 | 96.60 | 89.19 |
| Bfx 130 Std. | 2.5% | G | 42.99 | 14.84 | 10.48 | 130.88 | 92.16 | 84.91 |
| Bfx 130 Std. | 3.0% | G | 42.34 | 15.74 | 10.66 | 130.54 | 89.97 | 83.08 |
| Bfx 130 Std. | 4.0% | G | 40.72 | 17.33 | 11.51 | 128.83 | 84.94 | 77.99 |
| Bfx 130 Std. | 5.0% | G | 39.90 | 18.26 | 11.70 | 128.01 | 82.31 | 75.81 |

TABEL 4

| pigment | % | cement | L | a | b | R | G | B |
|---|---|---|---|---|---|---|---|---|
| Bfx 330 Std. | 0.5% | W | 56.38 | 1.00 | 2.75 | 139.12 | 134.43 | 130.46 |
| Bfx 330 Std. | 1.0% | W | 50.80 | 0.97 | 1.74 | 124.00 | 120.29 | 118.01 |
| Bfx 330 Std. | 2.0% | W | 43.92 | 0.92 | 1.04 | 106.17 | 103.24 | 102.10 |
| Bfx 330 Std. | 2.5% | W | 42.23 | 0.87 | 0.86 | 101.80 | 99.14 | 98.26 |
| Bfx 330 Std. | 3.0% | W | 39.98 | 0.90 | 0.68 | 96.23 | 93.68 | 93.11 |
| Bfx 330 Std. | 4.0% | W | 38.00 | 0.88 | 0.50 | 91.28 | 88.94 | 88.64 |
| Bfx 330 Std. | 5.0% | W | 35.79 | 0.84 | 0.46 | 85.90 | 83.70 | 83.45 |
| Bfx 330 Std. | 0.5% | G | 48.16 | 0.75 | 6.28 | 120.12 | 113.51 | 103.82 |

TABEL 4-continued

| pigment | % | cement | L | a | b | R | G | B |
|---|---|---|---|---|---|---|---|---|
| Bfx 330 Std. | 1.0% | G | 45.50 | 0.69 | 4.82 | 112.36 | 107.02 | 99.73 |
| Bfx 330 Std. | 2.0% | G | 41.23 | 0.78 | 3.73 | 101.22 | 96.58 | 91.18 |
| Bfx 330 Std. | 2.5% | G | 40.06 | 0.74 | 3.28 | 97.99 | 93.79 | 89.10 |
| Bfx 330 Std. | 3.0% | G | 38.73 | 0.71 | 3.19 | 94.65 | 90.61 | 86.07 |
| Bfx 330 Std. | 4.0% | G | 37.04 | 0.70 | 2.66 | 90.20 | 86.61 | 82.91 |
| Bfx 330 Std. | 5.0% | G | 35.22 | 0.83 | 2.54 | 85.98 | 82.23 | 78.82 |

Table 1 to Table 4 show color measurements of real concrete products, for example, by the user and the cement or alternative cement used by him, namely white cement (W) with L* value of 78.23 and grey cement (G) with L* value of 53.82. For coloring the real concrete products, for example, different colored pigments such as Bfx 920 (yellow), Bfx 110 (yellowish red), Bfx 130 (blueish red) and Bfx 330 (black) were used. These are standard colors (Std.) from the Lanxess company. These color pigments were added in different percentages by weight based on the cement content or alternative cement content. According to the invention, the color pigments are added at a weight % in the range of 0.1-10, based on the cement content or alternative cement content, irrespective of the pigments used.

The measured values listed in the tables are the coordinates L, a, b of the color location of the real concrete product and RGB values for the respective determination method, in particular the CIEL*a*b* color space. According to the invention, for example, the RGB values measured in this way are used and stored in the control unit. In this way, customer-specific color triangles are created and stored in the control unit so that the customer's own color mixtures can be created using the customer's own color pigments, in this case for example those specified above, and real raw materials used, such as cement or alternative cement, sand, gravel. In this way, colored concrete products can be created whose color impression is improved by individual selection of the color mixture and which are designed with individual color nuances by the selected color mixture.

The alternative cement is preferably a climate-friendly alternative to conventional cement, i.e. so-called cement substitutes. Using a previously unused overburden product from bauxite mining as a raw material can, for example, reduce carbon dioxide ($CO_2$) emissions during production by up to two thirds. At the same time, the alternative cement is just as stable as the previous cement. Research into alternatives to cement has been going on for several years. Cement production generally does not work entirely without calcium carbonate, but at least 50 to 60 percent of the carbonic acid lime can be replaced by substitutes.

The subject matter of the present application thus relates not only to cement, but also to alternative cement, which may contain, for example, up to 60 percent substitution materials such as bauxite/Belterra clay. This alternative cement or cement substitute also has an inherent color which influences the color design of concrete to be produced.

The invention now being fully described it will be apparent to one of ordinary skill in the art that many changes and modifications can be made thereto without departing from the spirit or scope of the appended claims.

The invention claimed is:

1. Device for metering color pigments as an additive for cement or alternative cement for the production of colored concrete products, comprising at least three containers for receiving respectively different color pigments, a control unit for setting the discharge quantities from the containers, and a sensor system coupled to the control unit in order to meter a color pigment composition taking into account the discharge quantities detected by the sensor system, wherein at least one brightness value L* value for the inherent color of the cement or alternative cement of the concrete product to be colored in each case is stored or storable in the control unit, and the control unit is configured to apply a color triangle as a function of the at least one L value for controlling the output of predetermined quantities of the color pigments from the at least three containers based on a set of three standard color values X, Y, Z.

2. Device according to claim 1, wherein the control unit has an input mask for standard color values X, Y, Z defined by a CIEL*a*b* color space.

3. Device according to claim 1, wherein the stored or storable L* value is determined by grey shades of the inherent color of a cement or alternative cement with values between 40 and 92.5.

4. Device according to claim 1, wherein the different color pigments are color pigment mixtures or primary color pigments.

5. Device according to claim 1, wherein the control unit is designed to generate color shades from the standard color values X,Y,Z by controlling mixing ratios at output quantities of the color pigments or color pigment mixtures from the at least three containers.

6. Device according to claim 5, wherein a color generator is associated with the control unit online or offline.

7. Device according to claim 1, wherein the control of the output of defined quantity ratios of the color pigments can be calibrated by measuring a real concrete product.

8. Device according to claim 1, wherein the control unit has an input mask for the selectable or changeable input of an L* value.

9. Device according to claim 1, wherein the standard color values X,Y,Z define absolute colors comprising RGB values, related to the brightness value L* of the inherent color of the cement or alternative cement used in each case.

10. Color generator for a device for metering color pigments as an additive for cement or alternative cement for the production of colored concrete products, comprising at least three containers for receiving in each case different color pigments, a control unit for setting the discharge quantities from the containers and a sensor system coupled to the control unit in order to meter a color pigment composition taking into account the discharge quantities detected by the sensor system, wherein at least one brightness value L* value for the inherent color of the cement or alternative cement of the concrete product to be colored in each case is stored or storable in the control unit, and the control unit is configured to use three fixable RGB values to apply a color triangle as a function of the at least one L* value for controlling the output of defined quantity ratios of the color pigments from the at least three containers.

11. Color generator according to claim 10, wherein the generator is an add-on device of a concrete plant to control a metering and dispensing system for batch weighing of paint pigments to be discharged to change the inherent color of a concrete by being added to the basic material including cement or alternative cement.

* * * * *